United States Patent Office 2,959,977
Patented Nov. 15, 1960

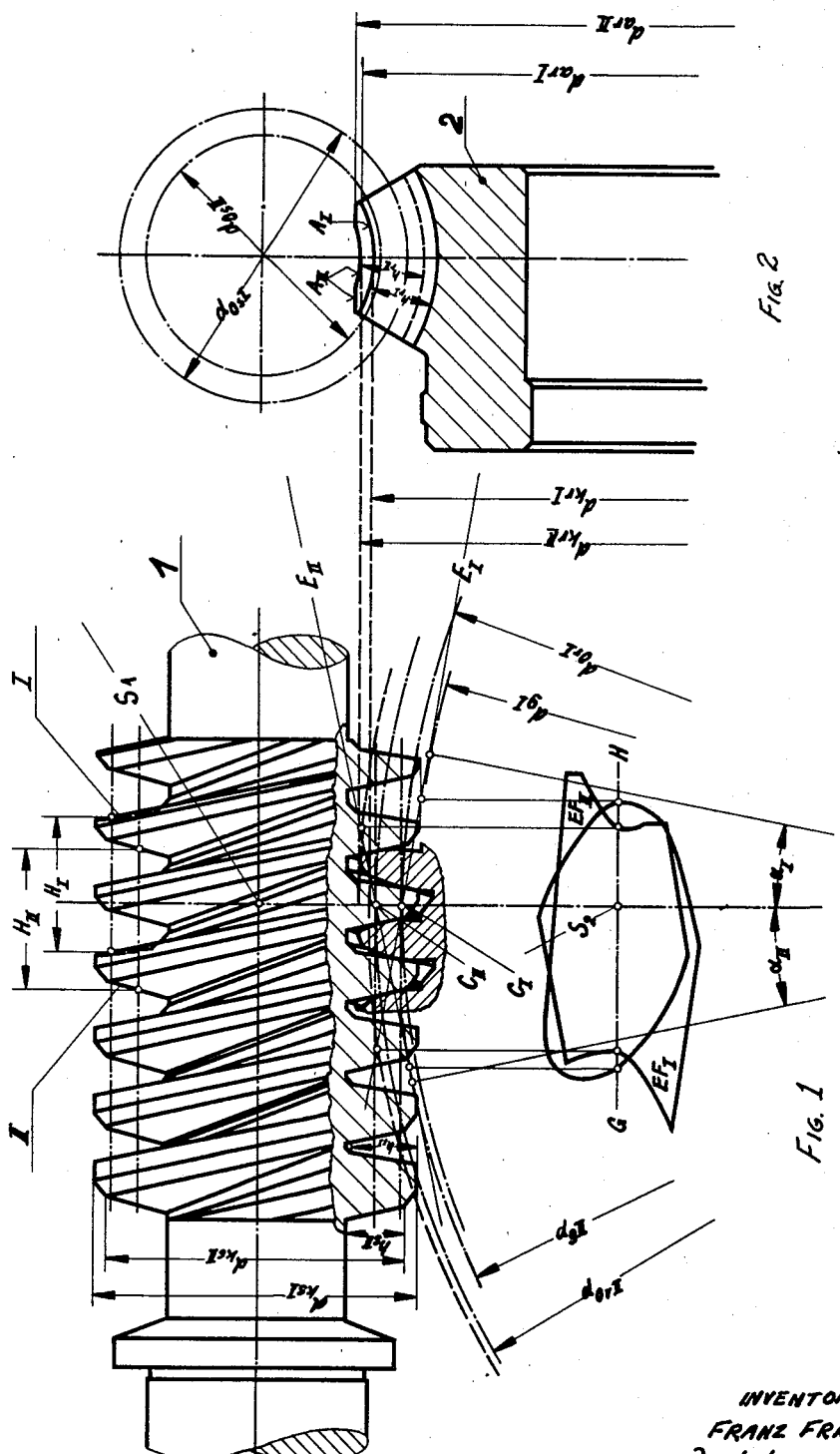

2,959,977

WORM GEAR

Franz Franke, Ludwigsburg, Germany, assignor to Firma Hermann Pfauter, Ludwigsburg, Wurtt, Germany Filed Jan. 13, 1959, Ser. No. 786,626

6 Claims. (Cl. 74—458)

This invention relates to a worm gear having a worm provided with a different lead for each flank. Worm gearing of this type is known as duplex or dual-lead worm gearing. The advantage inherent in this type of gearing is the possibility of low-backlash engagement of the worm in the worm wheel and of backlash adjustment by axial shifting of the worm in case of wear.

It is also well known that in worm as well as other gearing, small angles of action and long flanks give long times of engagement. Moreover, in worm gearing with a small angle of action the effect of any eccentricity of the worm on the rotation of the wheel is less marked than when the angle of action is large.

In a worm gear, the angle of action can be lessened and the flanks lengthened to a point where an undercut is produced which obviates any further lengthening of the time of engagement. The limit of the undercut in worm gears is determined, just as in spur gears, by the base circle diameter or, more specifically, by the base circle diameter of the worm wheel toothing in the throat circle and by the extension of the line of action which is tangent to the base circle.

Moreover, in designing a duplex worm gear care will be taken, just as in designing a normal worm gear, that the zones of contact of the right and left flanks overlap each other. By definition, the zone of contact in this connection is the projection of the area of contact on to the plane parallel to the axes of the worm and the worm wheel. Mutual overlapping of the zones of contact is desirable with a view to permitting the use of minimum lengths of worm and optimum utilization thereof.

In duplex gearing of known type, the flanks can be lengthened and the angle of action on the large worm-lead side of the gearing lessened only insufficiently as the base circle diameter is rather large in comparison to the addendum circle diameter. The small worm-lead side of the gearing, however, permits further lengthening of the flanks or lessening of the angle of action, as the diameter of the base circle is small in comparison to that of the addendum circle.

From this it follows that when the limit of undercut has been reached on the large-lead side of the gearing it has not yet been reached on the small-lead side thereof. It is the purpose of this invention to obviate this disadvantage by proposing the selection of advantageous and suitable external surfaces of different size for both the small-lead and the large-lead side of the gearing and for both the worm and the worm wheel. The correct design of the external surfaces can be readily found in each instance by an analysis of the gearing.

The accompanying drawing shows an example of a gear of this type, wherein Fig. 1 is a combined front elevation and plan view projection of the novel worm gear, and Fig. 2 is a side elevation of the worm gear. For simplicity's sake, straight sections have been used for the meridian sections of both worm flanks, I and II, as far as they come into mesh. Their leads $H_I$ and $H_{II}$ are different, and so are their angles of action $\alpha_I$ and $\alpha_{II}$ in axial section. The plane section through the worm axis and normal to the worm wheel axis then intersects the working faces of the two worm flanks in straight lines designated $E_I$ and $E_{II}$. These intersect the shortest distance $S_1$–$S_2$ at the pitch points $C_I$ and $C_{II}$ and include with said shortest distance the complementary angles of $\alpha_I$ and $\alpha_{II}$. Through the two points $C_I$ and $C_{II}$ pass the two rolling contact axes in parallel with the wheel axis and, moreover, the pitch circles $d_{OrI}$ and $d_{OrII}$ of the wheel and $d_{OsI}$ and $d_{OsII}$ of the worm.

The area of contact of the flanks I is limited, on one side, by the outer cylinder of the worm (also called external surface of the worm) whose diameter is $d_{ksI}$ and on the other, by the external surface of the worm wheel, which in side elevation shows its meridian section $A_I$. The area of contact of the other flanks II is limited by the outer cylinder of the worm (also called external surface of the worm) whose diameter is $d_{ksII}$ and, respectively, the external surface of the worm wheel with its meridian section $A_{II}$. The plan view shows the zones of contact, that is, the projections $EF_I$ and $EF_{II}$ of the two areas of contact on to the plane parallel to the two axes, said zones of contact having been drawn according to the well known geometric rules. The choice of the magnitude of the diameters $d_{ksI}$, $d_{ksII}$ and of the position and shape of the external surfaces $A_I$ and $A_{II}$, or of the external surfaces of one of the two gear members only, enables the limits of the areas $EF_I$ and $EF_{II}$ to be moved in the direction of the worm axis G—H and to be shifted as desired.

Use has been made in the example of the possibility of using different angles of action $\alpha_I$ and $\alpha_{II}$ in the axial section of the worm. The associated base circle diameters of the worm wheel, $d_{gI}$ and $d_{gII}$, then become different as well. In most instances, however, they can be made identical without any disadvantage, as the shifting of the external surfaces is a very efficient measure, and in addition the effects thereof can be quickly realized.

I would mention in conclusion that the different between the outer diameters $d_{arI}$ and $d_{arII}$ of the worm wheel is generated by the buckled section of the worm wheel hob.

The external surface of the worm for side I of the gearing is then obtained in the following manner:

Let it be assumed that a point moves, at a distance $$\frac{d_{ksI}}{2}$$

form the worm axis, parallel to the same throughout the length of the worm so that it forms a straight line limited by the length of the worm. Let it be further assumed that this line rotates through 360° about the worm axis and at a constant distance therefrom so that it forms the external surface of the worm associated with side I of the gearing.

The external surface of the worm for side II of the gearing is then obtained in the following manner:

Let it be assumed that a point moves at a distance $$\frac{d_{ksII}}{2}$$

from the worm axis, parallel to the same throughout the length of the worm so that it forms a straight line limited by the length of the worm. Let it be further assumed that this line rotates through 360° about the worm axis and at a constant distance therefrom so that it forms the external surface of the worm associated with side II of the gearing.

The generation of the external surfaces of the worm wheel can be imagined in the following manner. Let us begin by considering the external surface $A_I$ associated with the worm wheel flank I. On the shortest line interconnecting the worm wheel and worm axes (distance between axes), there is a point spaced $$\frac{d_{krI}}{2}$$

from the wheel axis.

Let us assume that this point moves towards the two sides of the worm wheel at a constant spacing from the worm axis, in a plane passing through the worm wheel axis, so that it forms an arc of circle. If this arc intersects the side faces of the worm wheel, the wheel limiting line in addition assumes the shape of the profile of the side faces of the wheel body. If then, the limiting line thus described rotates through 360° about the wheel axis and at a constant spacing therefrom, it forms the external surface of the wheel associated with side I of the gearing.

Let us now describe the external surface $A_{II}$ in the same manner as the external surface $A_I$. On the shortest line interconnecting the worm wheel and worm axis (distance between axes), there is a point spaced $$\frac{d_{krII}}{2}$$

from the worm wheel axis. Let us assume that this point moves towards the two sides of the worm wheel at a constant spacing from the worm axis, in a plane through the worm wheel axis, so that it forms an arc of a circle. If this arc intersects the generatrix of the worm wheel outer cylinder whose diameter is $d_{arII}$, the limiting line then assumes the shape of the wheel body. If then, said limiting line rotates through 360° about the worm wheel axis and at a constant spacing therefrom, it forms the external surface $A_{II}$ of the wheel associated with side II of the gearing.

What I claim is:

1. A worm gear arrangement comprising a worm member and a worm wheel member having a different lead for each flank, and at least one of said members having different outside and root diameters of the right-hand and left-hand flanks.

2. The arrangement according to claim 1, wherein both of said members have different outside and root diameters of the right-hand and left-hand flanks.

3. The arrangement according to claim 1, wherein only said worm member has different outside and root diameters of the right-hand and left-hand flanks.

4. The arrangement according to claim 1, wherein only said worm wheel member has different outside and root diameters of the right-hand and left-hand flanks.

5. The arrangement according to claim 1, wherein both flanks of said worm member are provided with different pressure angles in the axial section thereof.

6. The arrangement according to claim 1, wherein both flanks of said worm member are provided with identical pressure angles in the axial section thereof.

References Cited in the file of this patent

UNITED STATES PATENTS

| | | |
|---|---|---|
| 1,683,163 | Cone | Sept. 4, 1928 |
| 1,822,800 | Cone | Sept. 8, 1931 |
| 1,852,775 | Head | Apr. 5, 1932 |
| 1,966,357 | Robak | July 10, 1934 |

FOREIGN PATENTS

| | | |
|---|---|---|
| 478,968 | Germany | July 5, 1929 |